(12) United States Patent
Patil (10) Patent No.: US 11,266,939 B2
(45) Date of Patent: Mar. 8, 2022

(54) ADJUSTABLE FILTER ASSEMBLIES FOR HVAC SYSTEMS

(71) Applicant: Johnson Controls Technology Company, Auburn Hills, MI (US)

(72) Inventor: Gaurav S. Patil, Pune (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 472 days.

(21) Appl. No.: 16/218,105

(22) Filed: Dec. 12, 2018

(65) Prior Publication Data

US 2020/0179855 A1   Jun. 11, 2020

Related U.S. Application Data

(60) Provisional application No. 62/778,144, filed on Dec. 11, 2018.

(51) Int. Cl.
   *B01D 46/00*   (2006.01)
   *B01D 46/12*   (2006.01)

(52) U.S. Cl.
   CPC ....... *B01D 46/0016* (2013.01); *B01D 46/002* (2013.01); *B01D 46/0005* (2013.01); *B01D 46/008* (2013.01); *B01D 46/125* (2013.01); *B01D 2267/30* (2013.01)

(58) Field of Classification Search
   CPC ........... B01D 46/0016; B01D 46/0002; B01D 46/12; B01D 46/125; B01D 46/008; B01D 46/002; B01D 46/0005; B01D 2267/30; B01D 2275/203
   See application file for complete search history.

(56) References Cited

U.S. PATENT DOCUMENTS

| | | | |
|---|---|---|---|
| 6,214,076 B1 | 4/2001 | Beier et al. | |
| 6,294,004 B1 | 9/2001 | Summers et al. | |
| 6,485,538 B1 | 11/2002 | Toyoshima | |
| 6,652,613 B2 | 11/2003 | Shah et al. | |
| 7,320,720 B2 | 1/2008 | Ticknor | |
| 7,452,396 B2 | 11/2008 | Terlson et al. | |
| 7,537,630 B2 | 5/2009 | Schuld et al. | |
| 2012/0260803 A1* | 10/2012 | Wiser ................. | B01D 46/0032 96/54 |
| 2013/0067877 A1 | 3/2013 | Griffiths et al. | |
| 2013/0133301 A1 | 5/2013 | Sproule et al. | |

(Continued)

FOREIGN PATENT DOCUMENTS

| | | |
|---|---|---|
| EP | 1275907 | 1/2003 |
| EP | 1993735 | 11/2008 |
| WO | 2018128990 | 7/2018 |

*Primary Examiner* — Robert Clemente
*Assistant Examiner* — Hafiz Muhammad Aamir
(74) *Attorney, Agent, or Firm* — Fletcher Yoder, P.C.

(57) ABSTRACT

An adjustable filter assembly for a heating, ventilation, and/or air conditioning (HVAC) system includes a first filter retainer configured to capture a first filter and a second filter retainer configured to capture a second filter. The adjustable filter assembly also includes a hinge coupled between first filter retainer and the second filter retainer and about which the first filter retainer and the second filter retainer are configured to rotate to position the first filter and the second filter at an angle relative to one another in a first angled operating configuration and to align the first filter and the second filter with one another in a second angled operating configuration.

27 Claims, 7 Drawing Sheets

(56) References Cited

U.S. PATENT DOCUMENTS

| | | |
|---|---|---|
| 2015/0082988 A1 | 3/2015 | Butler et al. |
| 2017/0151522 A1 | 6/2017 | Knuckles |
| 2018/0111075 A1 | 4/2018 | Katare et al. |
| 2018/0264388 A1 | 9/2018 | Silvestro |

* cited by examiner

ADJUSTABLE FILTER ASSEMBLIES FOR HVAC SYSTEMS

CROSS REFERENCE TO RELATED APPLICATION

This application claims priority from and the benefit of U.S. Provisional Application Ser. No. 62/778,144, entitled "ADJUSTABLE FILTER ASSEMBLIES FOR HVAC SYSTEMS," filed Dec. 11, 2018, which is hereby incorporated by reference in its entirety for all purposes.

BACKGROUND

The present disclosure relates generally to heating, ventilation, and/or air conditioning (HVAC) systems, and more particularly to adjustable filter assemblies for HVAC systems.

A wide range of applications exist for HVAC systems. For example, residential, light commercial, commercial, and industrial systems are used to control temperatures and air quality in indoor environments and buildings. Such systems may be dedicated to either heating or cooling, although systems are common that perform both of these functions. Very generally, these systems operate by implementing a thermal cycle in which fluids are heated and cooled to provide air flow at desired temperature to a controlled space, typically the inside of a residence or building. For example, a refrigerant circuit may circulate a refrigerant through one or more heat exchangers to exchange thermal energy between the refrigerant and one or more fluid flows, such as a flow of air.

Generally, HVAC systems may include filter assemblies or sections having filters that remove particulates from an air flow before the air flow is conditioned and/or provided to a conditioned space. Based on the unique specifications for each HVAC system, the filter assembly therein may be selectively designed to hold various filters that utilize an available space within an enclosure of the HVAC system. However, because the filter assembly may be rigidly mounted within the enclosure, different HVAC systems having different air flow specifications may utilize individualized filter assemblies, such as flat filter assemblies or angled filter assemblies, which are particularly suited to their enclosures. Further, multiple filters of different sizes may be employed within the filter assemblies of these HVAC systems, which may complicate inventory demands and increase a corresponding difficulty for providing appropriately-sized filters to each filter section of the enclosure. Accordingly, it may be desirable to employ more versatile filter assemblies within the HVAC systems.

SUMMARY

In one embodiment of the present disclosure, an adjustable filter assembly for a heating, ventilation, and/or air conditioning (HVAC) system includes a first filter retainer configured to capture a first filter and a second filter retainer configured to capture a second filter. The adjustable filter assembly also includes a hinge coupled between first filter retainer and the second filter retainer and about which the first filter retainer and the second filter retainer are configured to rotate to position the first filter and the second filter at an angle relative to one another in a first angled operating configuration and to align the first filter and the second filter with one another in a second angled operating configuration.

In another embodiment of the present disclosure, an adjustable filter assembly for a heating, ventilation, and/or air conditioning (HVAC) system includes a plurality of filter modules. Each filter module of the plurality of filter modules is adjustable between a first angled operating configuration and a second angled operating configuration. Adjacent filter modules of the plurality of filter modules are each hingedly coupled to a respective guide plate. Additionally, each filter module of the plurality of filter modules includes a first filter retainer configured to capture a first filter and a second filter retainer configured to capture a second filter. Each filter module of the plurality of filter modules also includes a hinge coupled between first filter retainer and the second filter retainer and about which the first filter retainer and the second filter retainer are configured to rotate to position the first filter and the second filter at an angle relative to one another in the first angled operating configuration and to align the first filter and the second filter with one another in the second angled operating configuration.

In a further embodiment of the present disclosure, an adjustable filter assembly for a heating, ventilation, and/or air conditioning (HVAC) system includes a first filter retainer having a first end and a second end opposite the first end. The first filter retainer is configured to capture a first filter between the first end and the second end. The adjustable filter assembly includes a second filter retainer having a third end and a fourth end opposite the third end. The first filter retainer is configured to capture a second filter between the third end and the fourth end. The third end of the second filter retainer is hingedly coupled to the first end of the first filter retainer. The adjustable filter assembly also includes a first guide plate hingedly coupled to the second end of the first filter retainer and a second guide plate hingedly coupled to the fourth end of the second filter retainer. The second guide plate is movable relative to the first guide plate to enable rotation of the second filter retainer relative to the first filter retainer to position the first filter and the second filter at an angle relative to one another in a first angled operating configuration and to align the first filter and the second filter along a direction transverse to a direction of air flow through the adjustable filter assembly in a second angled operating configuration.

In another embodiment of the present disclosure, an adjustable filter assembly for a heating, ventilation, and/or air conditioning (HVAC) system includes a plurality of filter modules each including a respective first filter retainer and a respective second filter retainer pivotally coupled to the first filter retainer. The respective first filter retainer and the respective second filter retainer of the plurality of filter modules are arranged in an accordion-like configuration and are configured to be expanded or retracted from each other in an accordion-like configuration between a first angled operating configuration and a second angled operating configuration.

Other features and advantages of the present application will be apparent from the following, more detailed description of the embodiments, taken in conjunction with the accompanying drawings which illustrate, by way of example, the principles of the application.

DETAILED DESCRIPTION

The present disclosure is directed to an adjustable filter assembly for an HVAC system. As mentioned above, to remove particulates from air before the air is conditioned and/or provided to an interior space of a building, an HVAC system generally includes a filter assembly that retains filters upstream of heat exchangers of the HVAC system. Based on a size of an enclosure of the HVAC system and flow specifications for the HVAC system, a traditional filter assembly may be designed to statically retain appropriately-sized filters in either a flat operating configuration or a V-shaped operating configuration. In contrast to these traditional, rigidly-mounted filter assemblies, present embodiments are directed to an adjustable filter assembly that can be readily modified in shape, length, and orientation to suit multiple different HVAC systems having varied flow specifications. For example, the adjustable filter assembly may include filter retainers that are each hingedly coupled to a guide plate, or base plate, at one end and hingedly coupled to another filter retainer at another end. A number of filter retainers included in the adjustable filter assembly may be selectively attuned by adding or removing filter retainers and guide plates to the adjustable filter assembly, thereby enabling efficient adjustment of an effective filtering surface area provided by the adjustable filter assembly.

Each filter retainer may capture and retain a filter of a same or common size, thereby reducing a demand for differently-sized filters for different filter assemblies or even for differently-sized filters for different portions of a single filter assembly. Further, lateral ends of the guide plates are received within guide rails, or fixing plates, mounted within the enclosure of the HVAC system. The guide rails may be mounted either horizontally or vertically within the enclosure to orient the filter retainers to be either vertically-extending or horizontally-extending within the enclosure, respectively. Further, by moving the guide plates along the guide rails, angles between the filter retainers may be adjusted between both a flat operating configuration and an angled or V-shaped operating configuration to tune the adjustable filter assembly for different flow specifications. Indeed, the adjustable filter assembly may have an accordion-like configuration such that it can be manipulated in an accordion-like fashion to expand and/or retract respective filter retainers of adjacent pairs of filter retainers from each other. As discussed herein, the adjustable filter assembly includes additional components that further facilitate the movement and retention of the filter retainers in a target operating configuration. In these manners and more, the disclosed techniques provide a customizable, adjustable filter assembly that is well-suited for a wide range of HVAC systems.

Figure 1:
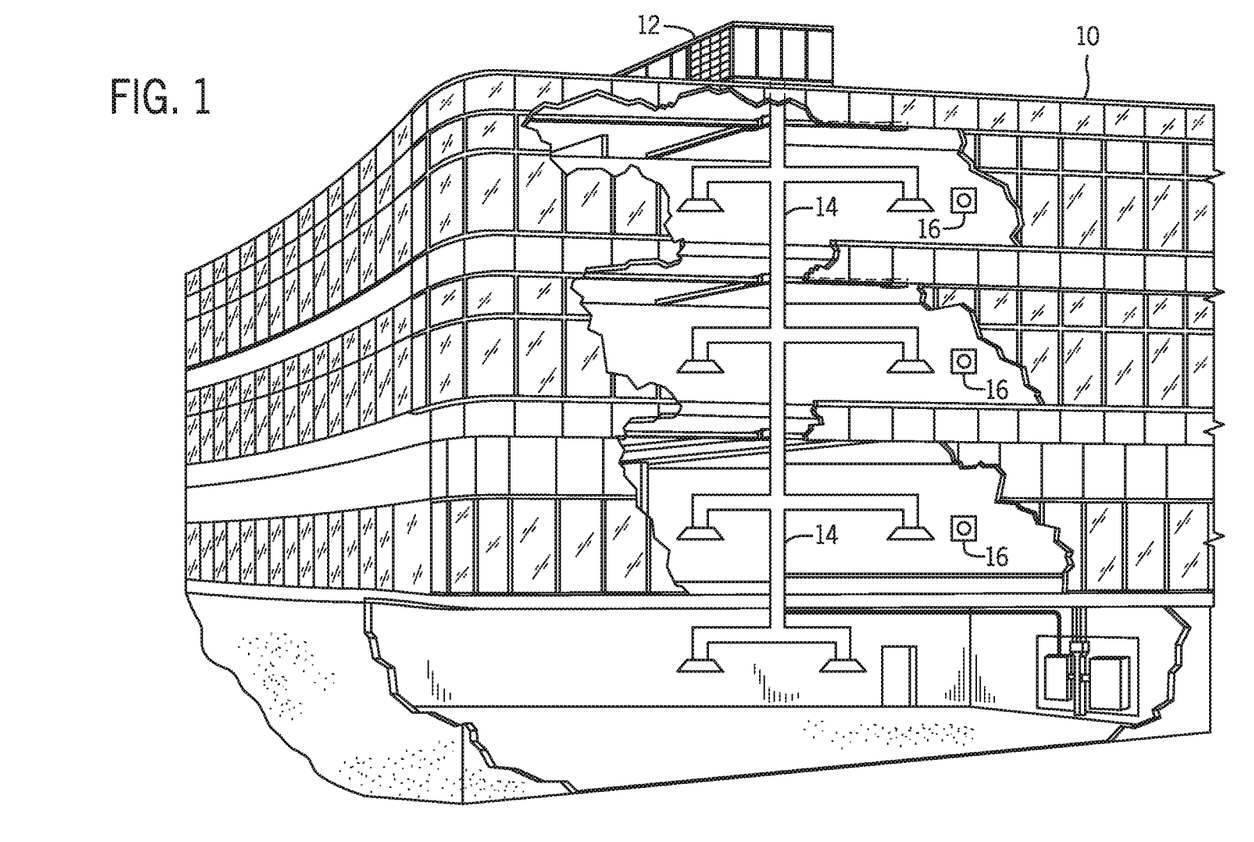
FIG. 1 is a perspective view of an embodiment of a commercial or industrial HVAC system, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
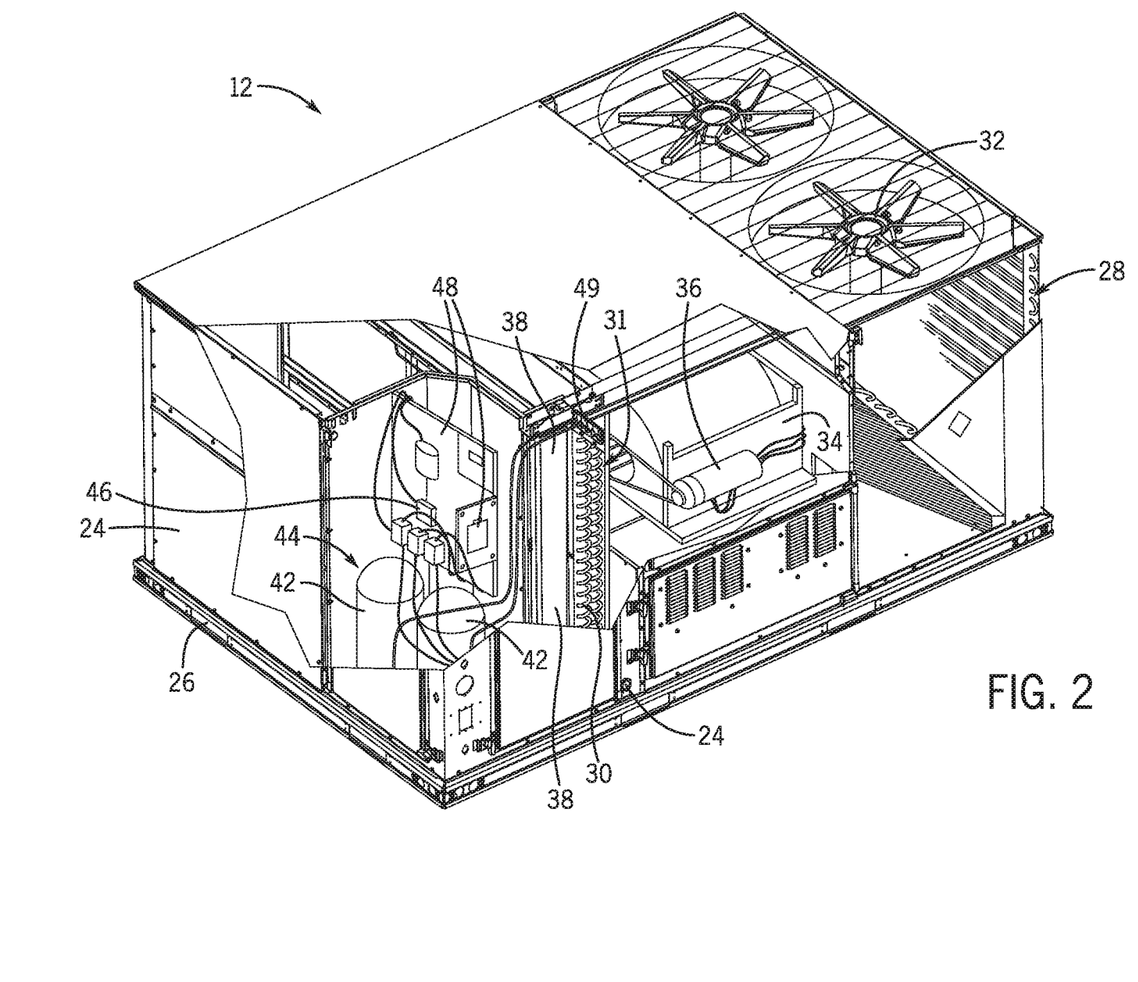
FIG. 2 is a perspective cutaway view of an embodiment of a packaged unit of an HVAC system, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
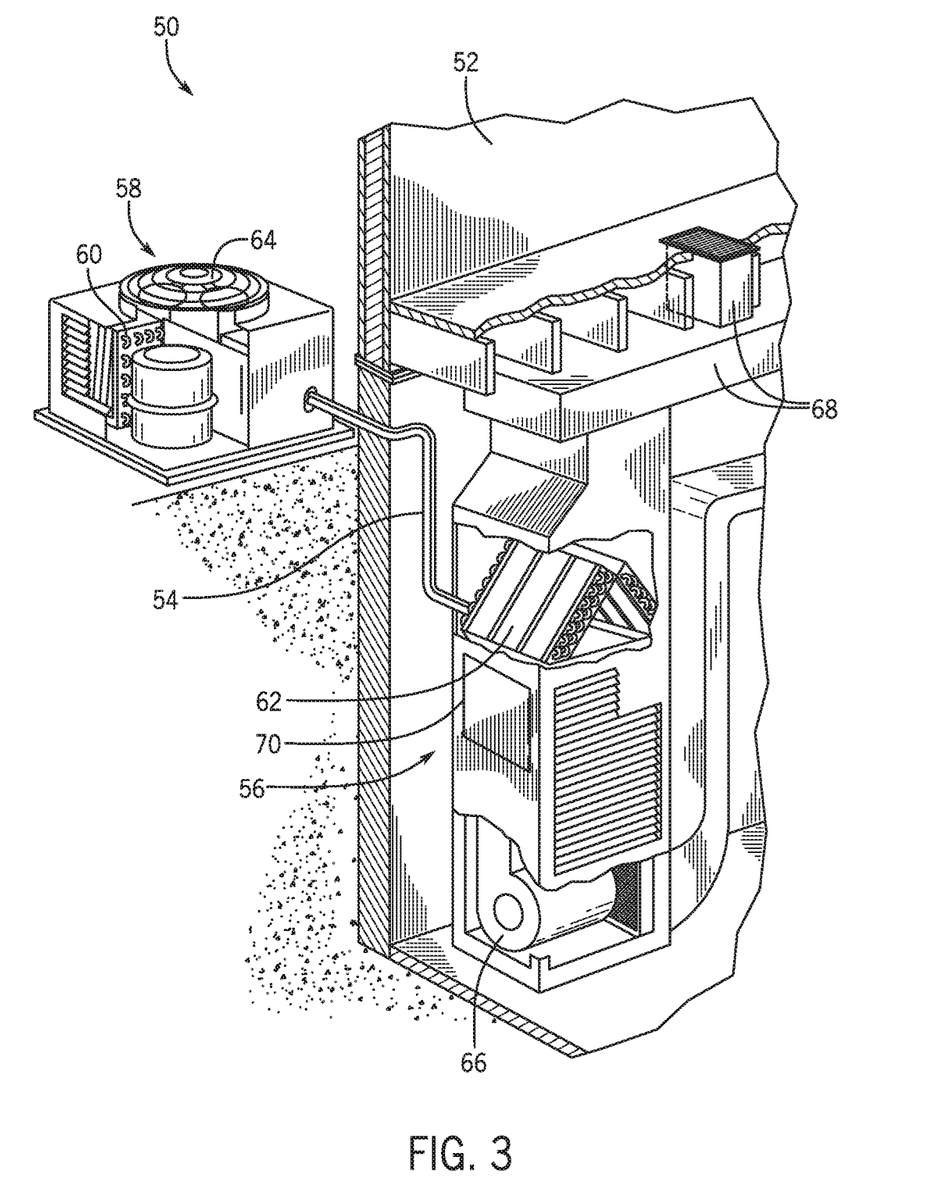
FIG. 3 is a perspective cutaway view of an embodiment of a split system of an HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
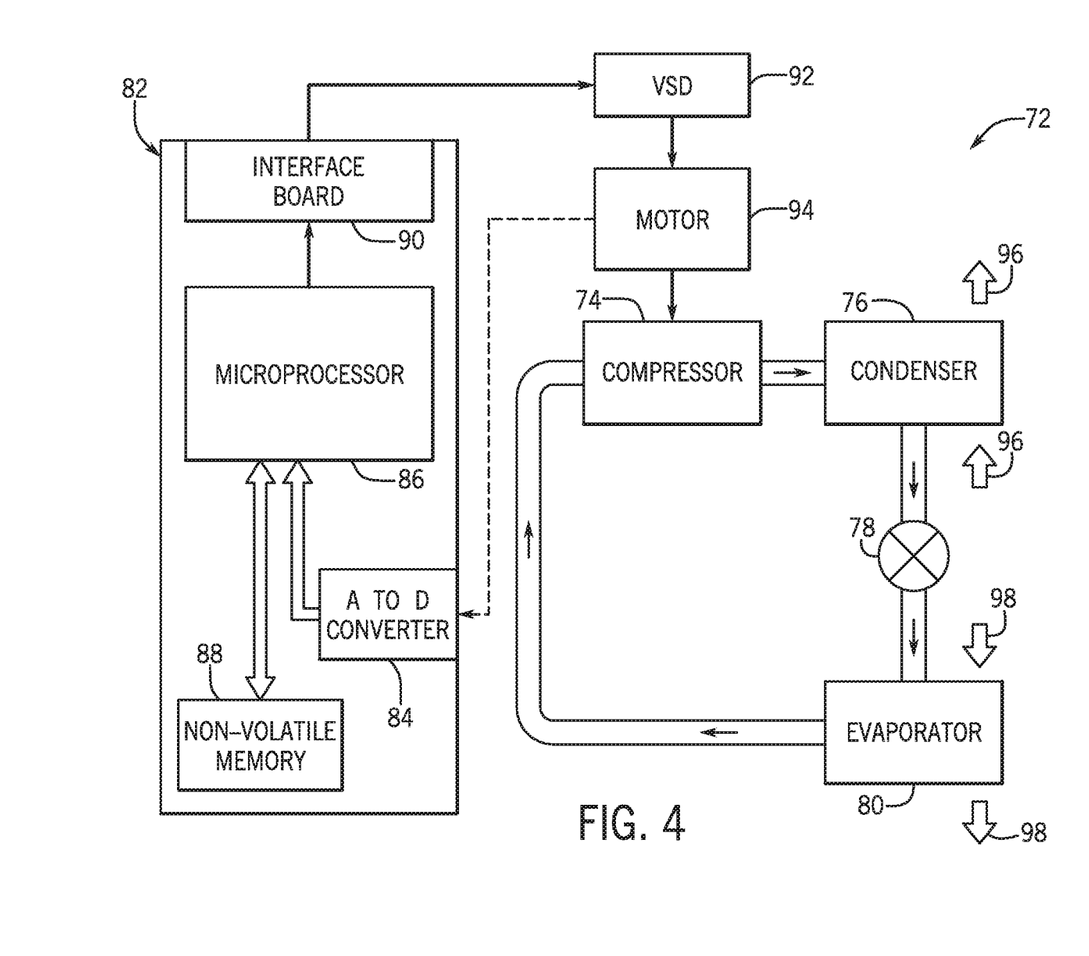
FIG. 4 is a schematic diagram of an embodiment of a vapor compression system of an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
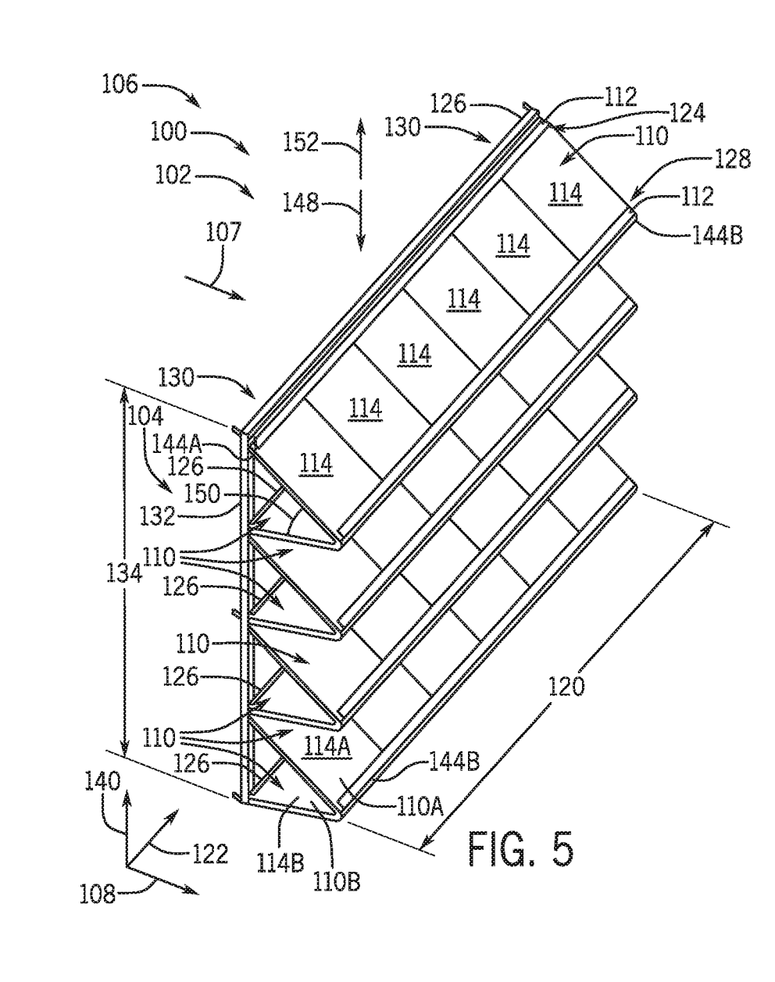
FIG. 5 is a perspective view of an embodiment of an adjustable filter assembly in a horizontal orientation, in accordance with an aspect of the present disclosure.

FIG. 5 is a perspective view of an embodiment of an adjustable filter assembly 100 in a horizontal orientation 102 and in a V-shaped operating configuration 104 or angled operating configuration, in accordance with an aspect of the present disclosure. As previously mentioned, the adjustable filter assembly 100 may be included within an HVAC system 106 to facilitate removal of particulates and/or contaminants from an air flow before the air flow is provided to condition a building, such as the building 10 discussed above. Indeed, as discussed above with reference to filter 38, the adjustable filter assembly 100 may be disposed on an air intake side of a heat exchanger within an enclosure of the HVAC system 106 to prevent or block contaminants from contacting the heat exchanger and/or entering the air flow provided to the building. Indeed, during operation of the HVAC system 106, an air flow 107 may generally be directed through the adjustable filter assembly 100 along an air flow axis 108. Although discussed herein with reference to the enclosure of the HVAC system 106, such as one of a roof top unit (RTU), including the adjustable filter assembly 100, it is to be understood that the present techniques may be extended to any suitable systems that employ filters, including split, residential, light commercial, commercial, and/or industrial HVAC systems.

As shown, the adjustable filter assembly 100 includes a quantity of filter retainers 110, each of which has two engagers 112 or filter retention channels for capturing filters 114 therebetween. The present embodiment includes eight filter retainers 110, each having six filters 114 captured between a respective pair of the engagers 112 of the respective filter retainer 110. However, it is to be understood that any suitable number or configuration of filter retainers 110, engagers 112, and/or filters 114 may be employed by the adjustable filter assembly 100 disclosed herein. Notably, the filters 114 are self-similar to one another, such as by having a same size designation, substantially the same size, a common part number, common physical dimensions, identical physical dimensions, and so forth. As used herein, filters 144 having substantially the same size have physical dimensions, such as length, width, and height, that are within five percent of one another. As such, the filters 114 may be ordered in bulk to reduce purchasing costs and/or enable a service technician to install the same size or model of filter within each filter retainer 110, regardless of whether the adjustable filter assembly 100 is installed horizontally or vertically within the HVAC system 106 and regardless of whether the adjustable filter assembly 100 is positioned in the V-shaped operating configuration 104 or a flat operating configuration. The engagers 112 are C-channels in the present embodiment that each captures a respective portion of a number of the filters 114. In other embodiments, other filter-capturing components may be used instead of or in addition to the C-channels, such as channels or clips having a different shape or that extend along a partial length of the filters 114. As used herein, the term "engager" refers to any component suitable for engaging with and retaining all or a portion of a filter 114 in a target position within the adjustable filter assembly 100.

In the illustrated horizontal orientation 102 of the adjustable filter assembly 100, the filter retainers 110 each have a filter retainer length 120 that is aligned with a lateral axis 122 of the HVAC system 106. That is, the horizontal orientation 102 refers to a horizontally-extending orientation of the filter retainers 110 in which the filter retainer length 120 extends laterally within the adjustable filter assembly 100. Each filter retainer 110 also includes a first end portion 124, which corresponds to one engager 112 and which is coupled to one of a number of guide plates 126 of the adjustable filter assembly 100. Each filter retainer 110 further includes a second end portion 128, which corresponds to another engager 112 and which is coupled to another, adjacent filter retainer 110. The guide plates 126 also extend in a same direction as the filter retainers 110, namely, along the lateral axis 122. To receive longitudinal ends 130 of each guide plate 126 as defined along the lateral axis 122, the adjustable filter assembly 100 includes two guide rails 132 that may each be coupled to an inner surface or component of the enclosure of the HVAC system 106. In the horizontal orientation 102, the guide rails 132 have a guide rail height 134 that extends vertically along a vertical axis 140 of the HVAC system 106, which is transverse or generally perpendicular to the lateral axis 122. Further, the guide rails 132 are C-channels in the present embodiment that enable movement of the guide plates 126 along the vertical axis 140, while blocking or preventing movement of the guide plates 126 along the air flow axis 108 or the lateral axis 122. However, in other embodiments, the guide rails 132 may have another suitable shape for enabling movement of the guide plates 126, such as a flat rail without a C-shaped cross-section.

Notably, the first end portion 124 of each filter retainer 110 is coupled to an adjacent guide plate 126 by a first hinge 144A, plate-to-retainer hinge, or other suitable pivotable connection, and the second end portion 128 of each filter retainer 110 is coupled to another, adjacent filter retainer 110 by a second hinge 144B, retainer-to-retainer hinge, or other suitable pivotable connection. In some embodiments, the hinges 144 each include a first panel coupled to one filter retainer 110 and a second panel coupled to a support, such as a hinge shaft or pin. An adjacent filter retainer 110 may also be coupled to the support to form a hinge axis about which the first panel and second panel rotate. Although discussed herein with reference to a single hinge 144 between adjacent filter retainers 110 and/or the guide plates 124, it is to be understood that the hinges 144 may include any suitable components that enable rotation of the components, such as two or more hinged connections. For example, in one of such embodiments, a first panel may be coupled to one filter retainer 110 and a second panel may be coupled to a support, such as a hinge shaft, to form a first hinge axis about which the first panel and second panel rotate. Additionally, a third panel may be coupled to an adjacent filter retainer 110 and a fourth panel may be coupled to the support to form a second hinge axis about which the third panel and the fourth panel rotate. As such, the hinges 144 or pivotable connections disclosed herein may each include one or multiple hinge axes.

Accordingly, by applying force along the vertical axis 140 to an outermost or edge guide plate 126, relative to the vertical axis 140, the filter retainers 110 may be rotated or pivoted to modify an operating configuration of the adjustable filter assembly 100. That is, by applying a force to an outermost or edge guide plate 126, in a direction 148 along the vertical axis 140, the filter retainers 110 are moved or pivoted closer together, thereby reducing an operating angle 150 between adjacent filter retainers 110. Alternatively, by applying force to an outermost edge guide plate 126, in a direction 152 along the vertical axis 140, the filter retainers 110 are moved or pivoted further away from another, thereby increasing the operating angle 150. The operating angle 150 is adjustable between 0 and 180 degrees, and may be selectively set to a desired or target operating angle for the adjustable filter assembly 100.

For example, the adjustable filter assembly 100 may be selectively moved into a flat operating configuration, the illustrated V-shaped operating configuration 104, or another V-shaped operating configuration having a larger or smaller operating angle 150 between the filter retainers 110 than the illustrated embodiment. In other words, a first filter retainer 110A and a second filter retainer 110B may rotate about the second hinge 144B coupled therebetween to position a first filter 114A and a second filter 114B at an angle relative to one another in the V-shaped operating configuration 104 or first operating configuration, and the first filter retainer 110A and the second filter retainer 110B may also rotate about the second hinge 144B to align the first filter 114A and the second filter 114B with one another along the vertical axis 140 to position the adjustable filter assembly 100 in a flat operating configuration or second operating configuration. As recognized herein and discussed in more detail below, in addition to being adjustable, the adjustable filter assembly 100 is modular. For example, a portion of the filter retainers 110 and corresponding guide plates 126 may be removed from the adjustable filter assembly 100 when the adjustable filter assembly 100 is arranged in either a flat operating configuration or a V-shaped operating configuration having a larger operating angle 150. Alternatively, filter retainers 110 and corresponding guide plates 126 may be added to the adjustable filter assembly 100 when the adjustable filter assembly 100 is arranged in a V-shaped operating configuration having a smaller operating angle 150.

Figure 6:
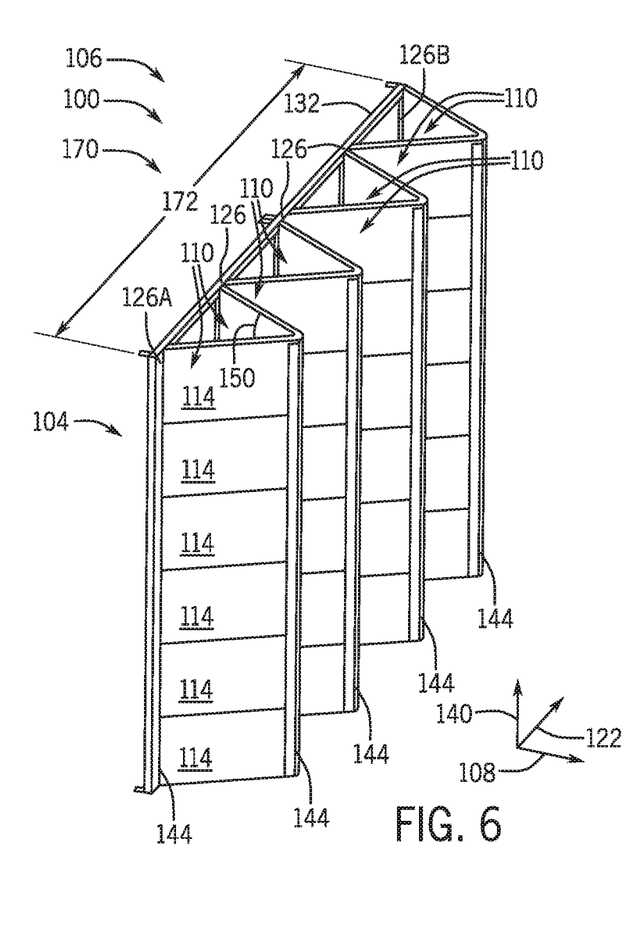
FIG. 6 is a perspective view of an embodiment of an adjustable filter assembly in a vertical orientation, in accordance with an aspect of the present disclosure.

Similarly, FIG. 6 is a perspective view of an embodiment of the adjustable filter assembly 100 in a vertical orientation 170 and in the V-shaped operating configuration 104, in accordance with an aspect of the present disclosure. The adjustable filter assembly 100 includes the filter retainers 110, the guide plates 126, and the guide rails 132 discussed above with reference to FIG. 5. However, because the guide rails 132 extend in a horizontal direction or orientation, or have a guide rail length 172 aligned along the lateral axis 122, the filter retainers 110 and guide plates 126 extend between the guide rails 132 vertically along the vertical axis 140. Indeed, the vertical orientation 170 of the adjustable filter assembly 100 refers to a vertically-extending orientation of the filter retainers 110 in which the filter retainers 110 extend vertically along the vertical axis 140. Accordingly, by applying force to a first guide plate 126A or first outer guide plate of the guide plates 126, the guide plates 126 are movable along the guide rails 132 and along the lateral axis 122 to adjust the operating angle 150 between adjacent filter retainers 110. In some embodiments, one side of a second guide plate 126B or second outer guide plate of the guide plates 126 is fixed to an inner surface or component of the enclosure of the HVAC system 106 to enable more efficient movement of the first guide plate 126A relative to the second guide plate 126B and more efficient adjustment of the adjustable filter assembly 100 overall. The other side of the second guide plate 126B is may be hingedly coupled to the adjacent filter retainer 110, which may be a component of an edge filter module discussed below with reference to FIG. 7. In some embodiments, the adjustable filter assembly 100 in the vertical orientation 170 may be more easily modified in length than the adjustable filter assembly 100 in the horizontal orientation 102 of FIG. 5 because a weight of the filter retainers 110 and guide plates 126 is supported by the adjustable filter assembly 100 in the vertical orientation 170. That is, after opening an access panel of the HVAC enclosure, the first guide plate 126A may be pulled along the guide rails 132 in a direction along the lateral axis 122 to move the adjustable filter assembly 100 into the flat operating configuration. Because a number of the filter retainers 110 may therefore extend out of or beyond the HVAC enclosure along the lateral axis 122 when the adjustable filter assembly 100 is in the flat operating configuration, convenient access to the hinges 144 for addition or removal of filter retainers 110 and/or guide plates 126 is provided. The adjustable filter assembly 100 includes supporting components that facilitate this process, as discussed in more detail herein.

Figure 7:
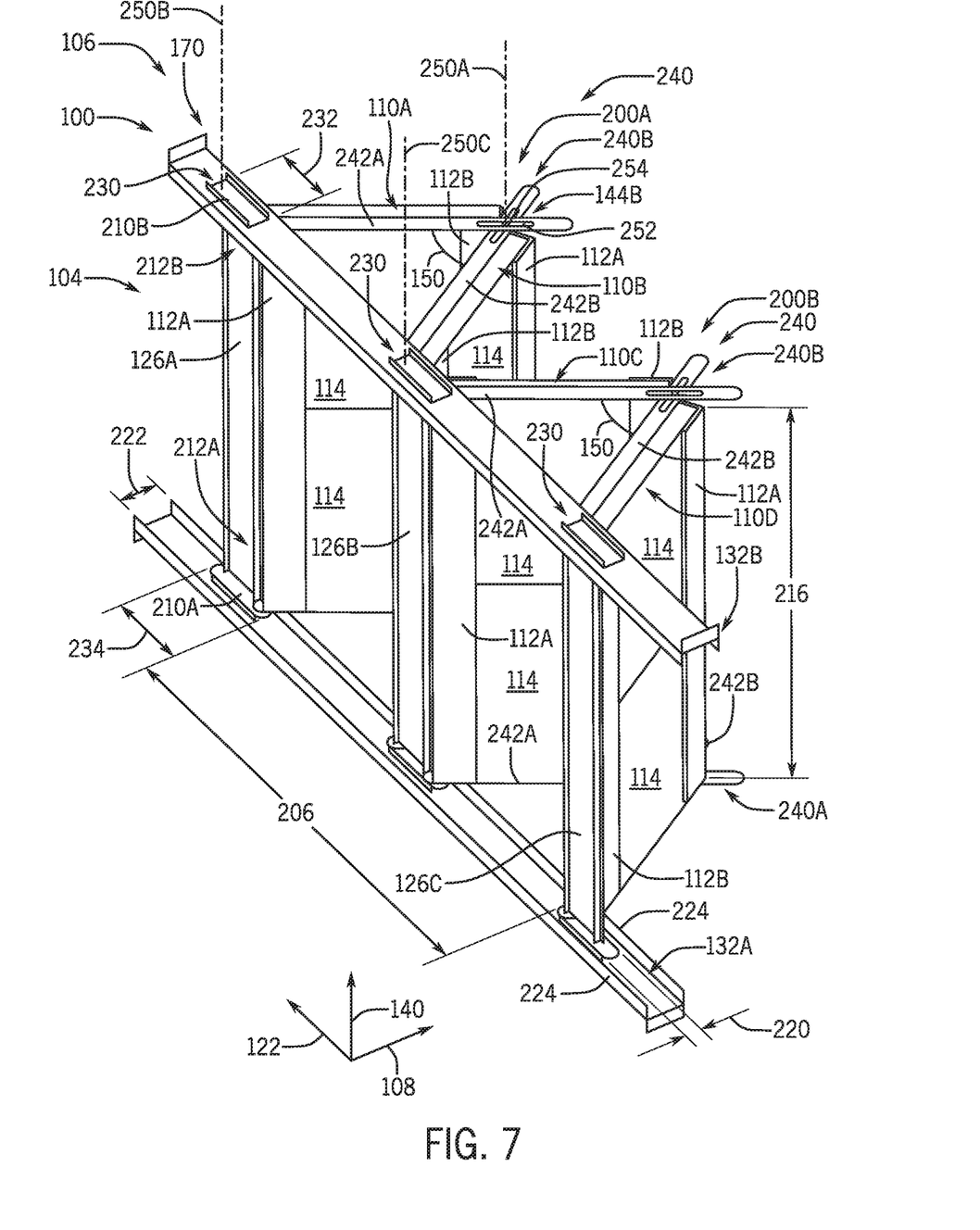
FIG. 7 is a perspective view of an embodiment of an adjustable filter assembly in a vertical orientation, in accordance with an aspect of the present disclosure.

FIG. 7 is a perspective view of an embodiment of the adjustable filter assembly 100 in the vertical orientation 170, in accordance with an aspect of the present disclosure. The illustrated embodiment of the adjustable filter assembly 100 includes two filter modules 200, each of which forms a V-shape with two filter retainers 110 and includes an accordion-like configuration that enables each filter retainer 110 of the filter modules 210 to expand and/or retract relative to one another. That is, a first filter retainer 110A and a second filter retainer 110B form a first filter module 200A of the adjustable filter assembly 100, while a third filter retainer 110C and a fourth filter retainer 110D form a second filter module 200B of the adjustable filter assembly 100. More particularly, the filter retainers 110 each include a first engager 112A and a second engager 112B that capture two filters 114 therebetween. Additionally, the second engager 112B of the first filter retainer 110A is hingedly coupled to the first engager 112A of the second filter retainer 110B, and the second engager 112B of the third filter retainer 110C is hingedly coupled to the first engager 112A of the fourth filter retainer 110D. Moreover, a first guide plate 126A is hingedly coupled to the first engager 112A of the first filter retainer 110A, a second guide plate 126B is hingedly coupled to the second engager 112B of the second filter retainer 110B and hingedly coupled to the first engager 112A of the third filter retainer 110C. Similarly, a third guide plate 126C is hingedly coupled to the second engager 112B of the fourth filter retainer 110D. As shown, the first filter module 200A and the second filter module 200B each have the operating angle 150 between their respective filter retainers 110 that provides an effective filter length that is longer than a separation distance 206 between the first guide plate 126A and the third guide plate 126C along the lateral axis 122. Thus, the adjustable filter assembly 100 in the V-shaped operating configuration 104 provides an increased filter surface area compared to a filter assembly in a flat operating configuration.

As discussed above, the adjustable filter assembly 100 is movable, expandable, and/or collapsible between various operating configurations. To facilitate translation of the guide plates 126 and a corresponding adjustment of the operating angles 150 of the filter modules 200, the adjustable filter assembly 100 includes the guide rails 132 introduced above. In particular, a first guide rail 132A is provided beneath the guide plates 126 relative to the vertical axis 140, and a second guide rail 132B is provided above the guide plates 126 relative to the vertical axis 140. In the present embodiment, a respective slide plate 210 is coupled to each longitudinal end of each guide plate 126 to further enhance movement of the guide plates 126 relative to one another by reducing friction between the guide plates 126 and the guide rails 132. For example, a first slide plate 210A is coupled to a first longitudinal end 212A or end portion of each guide plate 126 and a second slide plate 210B is coupled to a second longitudinal end 212B or end portion of each guide plate 126. The slide plates 210 may be coupled to the guide plates 126 by the same hinges or other pivotable connections that couple the guide plates 126 to the filter retainers 110, in some embodiments. That is, the hinges and/or hinge pins thereof may extend beyond a full height 216 of the filter modules 200.

In the illustrated embodiment, the slide plates 210 are channel-shaped components having a flat main body and base extensions protruding therefrom to contact one of the guide rails 132. As such, the base extensions provide a reduced surface area of contact between the slide plates 210 and the guide rails 132 during movement of the filter modules 200, as compared to embodiments of the adjustable filter assembly 100 without base extensions on the slide plates 210 or embodiments of the adjustable filter assembly 100 without slide plates 210. It is to be understood that the slide plates 210 may be or may include any other suitable components for enabling movement of the guide plates 126 along the guide rails 132 in other embodiments, such as wheeled plates, flat plates without base extensions, bearing surfaces, low-friction surfaces, rollers, and so forth. Further, the slide plates 210 have a slide plate width 220 that is smaller than a guide rail width 222 so that the slide plates 210 are generally encouraged to move along the lateral axis 122 and are restricted from moving along the air flow axis 108 by raised rims 224 of the guide rails 132.

Moreover, to retain the adjustable filter assembly 100 in a target operating configuration, the second guide rail 132B of the illustrated embodiment includes retention recesses 230 formed therein along the vertical axis 140 that selectively receive the second slide plates 210B. The retention recesses 230 have a recess length 232 that is at least as long a slide plate length 234 of the slide plates 210 or the base extensions therefrom. As such, in the current V-shaped operating configuration 104, the second slide plates 210B are aligned with the retention recesses 230 along both the lateral axis 122 and the air flow axis 108 and are protruding into the retention recesses 230 along the vertical axis 140, thereby blocking unintentional movement of the second slide plates 210B. The second guide rail 132B may include additional retention recesses 230 formed therein for retaining the second slide plates 210B in the flat operating configuration and/or in another V-shaped operating configuration having a different operating angle 150 between the filter retainers 110. The retention recesses 230 may be through-holes that extend completely through a thickness of the second guide rail 132B along the vertical axis 140 in the present embodiment, though in other embodiments, the retention recesses 230 may be indentations or grooves that extend through a partial thickness of the second guide rail 132B. The retention recesses 230 may additionally or alternatively be provided on the first guide rail 132A for retaining the first slide plates 210A in place, in other embodiments. Further, the adjustable filter assembly 100 may include any other suitable retention mechanisms for preventing or blocking unintentional adjustment of the filter modules 200, such as magnets, wedges manually disposed between one or multiple of the slide plates 210 and/or guide plates 126, and so forth.

Further, although generally discussed with reference to manual adjustment of the adjustable filter assembly 100, the components discussed herein may additionally or alternatively be utilized with mechanized or motorized components, such as a servo motor configured to adjust a position of the first guide plate 126A relative to the third guide plate 126C. In these embodiments, the servo motor may automatically adjust the operating angle 150 between the filter retainers 110 to a target operating angle based on control signals provided by a controller. The controller may determine the target operating angle based on sensor feedback of the HVAC system 106, thereby enabling the operating configuration of the adjustable filter assembly 100 to be adaptively manipulated during operation of the HVAC system 106. In embodiments with a servo motor or other motorized component, the retention recesses 230 may be omitted from the second guide rail 132B, and the servo motor may be configured to selectively retain the adjustable filter assembly 100 in a target operating configuration.

The adjustable filter assembly 100 also includes support linkages 240 to support the filter retainers 110 of the filter modules 200 during operation of the HVAC system 106 and during adjustment of the filter modules 200, such as during assembly or maintenance of the HVAC system 106. More particularly, a first support linkage 240A is provided beneath each filter module 200 relative to the vertical axis 140 and a second support linkage 240B is provided above each filter module 200 relative to the vertical axis 140. Providing both support linkages 240 is advantageous in some embodiments to enable the adjustable filter assembly 100 to be selectively mounted in either the illustrated vertical orientation 170 or a horizontal orientation. However, in other embodiments, the first support linkages 240A and/or the second support linkages 240B may be omitted.

In the illustrated embodiment, each support linkage 240 includes a first slotted link 242A and a second slotted link 242B. Focusing on the second support linkage 240B of the first filter module 200A, the first slotted link 242A thereof extends between a first pivot axis 250A, which is aligned along a connection between the first filter retainer 110A and the second filter retainer 110B, and a second pivot axis 250B, which is aligned along a connection between the first filter retainer 110A and the first guide plate 126A. Similarly, the second slotted link 242B extends between the first pivot axis 250A and a third pivot axis 250C, which is aligned along a connection between the second filter retainer 110B and the second guide plate 126B. The pivot axes 250 are generally coaxial with the vertical axis 140 and may correspond to rotational axes or hinge axes of the hinges 144 or hinged couplings between the filter retainers 110 and the guide plates 126, as discussed above with reference to FIGS. 5 and 6. Additionally, each slotted link 242 includes a slot 252 or longitudinal slot formed therein that receives and retains a hinge shaft 254 of the hinge 144B of the respective first pivot axis 250A. Accordingly, during translation of the guide plates 126 along the guide rails 132, the hinge shaft 254 moves within the slots 252 of the slotted links 242 to enable rotation of the first filter retainer 110A relative to the second filter retainer 110B. Although illustrated as through-holes extending through a complete thickness of the slotted links 242 along the vertical axis 140 in the present embodiment, the slots 252 may alternatively be partial through-holes or grooves that receive a correspondingly-sized hinge shaft, pin, or other protrusion, in other embodiments. Further discussion of operation the support linkages 240 with reference to replacing the filters 114 of the adjustable filter assembly 100, or filter unloading and/or filter loading, is provided with reference to FIG. 8 below.

Figure 8:
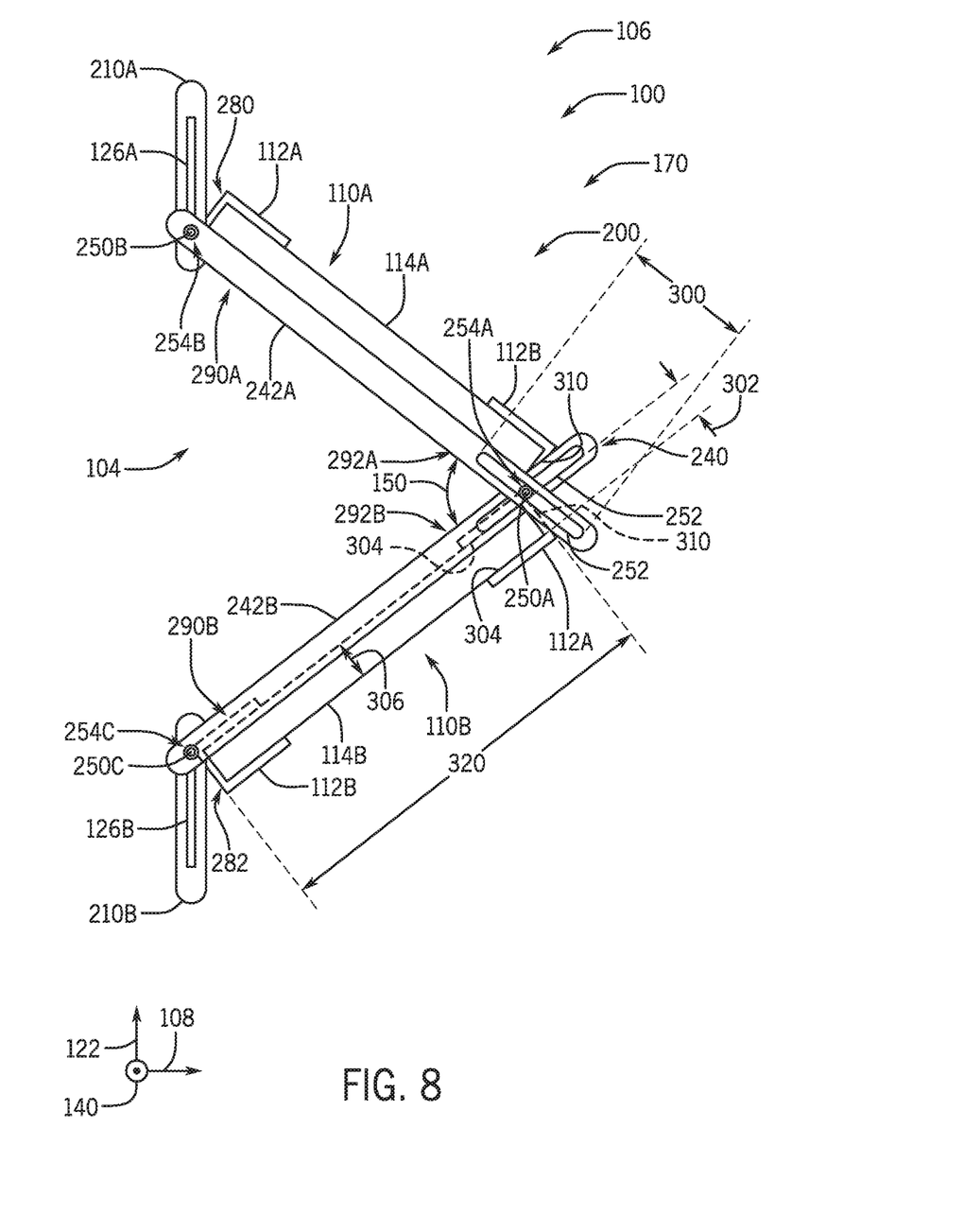
FIG. 8 is a cross-sectional plan view of an embodiment of an adjustable filter assembly in a vertical orientation, in accordance with an aspect of the present disclosure.

Indeed, FIG. 8 is a cross-sectional plan view of an embodiment of the adjustable filter assembly 100 in the vertical orientation 170 and positioned in the V-shaped operating configuration 104, in accordance with an aspect of the present disclosure. The present embodiment of the adjustable filter assembly 100 includes one filter module 200, which is formed by the first filter retainer 110A hingedly coupled at the first pivot axis 250A to the second filter retainer 110B via a first hinge shaft 254A. As discussed above, the first filter retainer 110A includes the first engager 112A and the second engager 112B collectively engaging or capturing the first filter 114A, and the second filter retainer 110B similarly includes the first engager 112A and the second engager 112B collectively engaging or capturing the second filter 114B. The first guide plate 126A is hingedly coupled to an edge 280 and/or the first engager 112A of the first filter retainer 110A at the second pivot axis 250B. Additionally, the second guide plate 126B is hingedly coupled to an edge 282 and/or the second engager 112B of the second filter retainer 110B at the third pivot axis 250C. The edges 280, 282 of the filter retainers 110 correspond to the engagers 112 of the filter retainers 110, in some embodiments. Further, the slide plates 210 are coupled to the longitudinal ends of the guide plates 126, such as by hinge shafts 254 extending therebetween or any other suitable fasteners or connecting features. That is, as shown, the first slide plate 210A, the first guide plate 126A, and a first end portion 290A of the first slotted link 242A are each coupled to a second hinge shaft 254B at the second pivot axis 250B. Similarly, the second slide plate 210B, the second guide plate 126B, and a first end portion 290B of the second slotted link 242B are each coupled to a third hinge shaft 254C at the third pivot axis 250C. The guide rails 132 are omitted in this embodiment to facilitate viewing of the guide plates 126 and the slide plates 210.

Moreover, a second end portion 292 of each slotted link 242 is retained around the first hinge shaft 254A of the first pivot axis 250A by the slots 252 defined therein. Each slot 252 has a slot length 300 that is at least twice as long as an engager width 302 or C-channel depth of the filter retainers 110, which is defined between inner-facing surfaces 304 of each engager 112, in the present embodiment. Additionally, the filters 114 each have a filter width 306 that corresponds to the engager width 302 and enables the filters 114 to be captured within the engagers 112 of each filter retainer 110. As such, the slots 252 enable the first hinge shaft 254A to move along the respective slot length 300 of each slot 252, thereby facilitating rotation of the adjustable filter assembly 100 into any suitable operating configuration. That is, the adjustable filter assembly 100 may move from a flat operating configuration, in which outer-facing surfaces 310 of adjacent filter retainers 110 face and/or abut one another, and the operating angle 150 is approximately 180 degrees, to any suitable V-shaped operating configuration 104, in which the outer-facing surfaces 310 of adjacent filter retainers 110 are angled relative to one another, and the operating angle 150 is less than 180 degrees.

In other words, in the flat operating configuration, the filters 114 of the filter module 200 are aligned with one another. When aligned, the outer-facing surfaces 310 of the filter retainers 110 face one another, and a line defined along the vertical axis 140 is coaxial, or within five percent of coaxial, of a line drawn through each filter 114. In other words, the filters 114 in the flat operating configuration are coplanar or within five percent of coplanar with one another in a plane generally defined between the lateral axis 122 and the vertical axis 140, which provides the operating angle 150 of 180 degrees or within five percent of 180 degrees. Notably, in some embodiments, the flat operating configuration may be a species or a subset of possible angled operating positions of the adjustable filter assembly 100, such as one in which the operating angle 180 is substantially 180 degrees. As further noted herein, in the V-shaped operating configuration 104, the filters 114 are positioned at the operating angle 150 relative to one another. The V-shaped operating configuration 104 may describe configurations having the operating angle 150 greater than 0 degrees and less than 180 degrees, such as between 30 degrees and 150 degrees, between 30 degrees and 120 degrees, between 60 degrees and 150 degrees, between 60 degrees and 120 degrees, and so forth. In certain embodiments, the filter retainers 110 of the adjustable filter assembly 100 may also be rotated to have an angle therebetween of 0 degrees, which corresponds to a non-operating, collapsed configuration that may desirably reduce space demands when transporting or storing the filter retainers 110.

With the above understanding of components of the adjustable filter assembly 100, discussion is provided herein directed to replacing the filters 114 of the adjustable filter assembly 100, which may be performed on a scheduled or predetermined basis to maintain an operating efficiency of the adjustable filter assembly 100. When the adjustable filter assembly 100 is installed in the HVAC system 106 in the vertical orientation 170 and in the V-shaped operating configuration 104, the filters 114 may be made accessible by first moving the adjustable filter assembly 100 into the flat operating configuration. An access panel of the enclosure of the HVAC system 106 may also be opened to enable the extended length of the adjustable filter assembly 100 to protrude out of the enclosure. Then, the second guide plate 126B may be removed by disassembling the hinge at the third pivot axis 250C. Physical support for the second filter retainer 110B previously attached to the second guide plate 126 is therefore provided by the support linkage 240 and the first guide rail 132A underneath the second filter retainer 110B. The fourth engager 112D of the second filter retainer 110B may then be pulled and separated from the third engager 112C by a separation distance that is greater than a filter length 320 of the filters 114 by applying force along the lateral axis 122, thereby exposing the second filter 114B and enabling the second filter 114B to be efficiently removed by applying force along the air flow axis 108. During the application of force to separate the fourth engager 112D from the third engager 112C, the second engager 112B may be similarly separated from the first engager 112A to similarly enable removal of the first filter 114A. Then, cleaned or new filters 114 may be positioned within each pair of the engagers 112, and force may be applied along the lateral axis 122 to move the engagers 112 closer together and capture the new filters 114. The second guide plate 126 and corresponding hinge at the third pivot axis 250C are then reassembled to enable operation of the adjustable filter assembly 100 within the HVAC system 106 with new filters 114.

Alternatively, to replace the filters 114 in the adjustable filter assembly 100 disposed in the horizontal orientation discussed above with reference to FIG. 5, the vertically-extending second guide rail 132B may be removed to release and/or expose the filters 114 and enable the filters 114 to be translated out of the filter retainers 110 along the lateral axis 122. In such an embodiment, the present plan view of the adjustable filter assembly 100 may instead be considered a side plan view, such as one in which the lateral axis 122 extends into the page. Thus, cleaned or new filters 114 may be moved within the filter retainers 110 along the lateral axis 122 and the second guide rail 132B may be replaced to complete the filter 114 replacement process.

Accordingly, embodiments discussed herein are directed to an adjustable filter assembly that may be positioned within an enclosure of an HVAC system in both a vertical orientation and a horizontal orientation. The adjustable filter assembly includes filter retainers that are each hingedly coupled to an adjacent filter retainer at one edge portion and are hingedly coupled to a guide plate at a second edge portion, with the guide plates at distal ends of the adjustable filter assembly functioning as edge base plates. The guide plates may include slide plates coupled thereto that enable the guide plates to translate along guide rails that are coupled to an inner surface of the enclosure. By moving one edge base plate relative to another edge base plate, individual filter retainers of each pair of the filter retainers may rotate relative to one another to position the adjustable filter assembly in a flat operating configuration or in one of multiple angled operating configurations. As such, the adjustable filter assembly provides flexibility in the manufacturing process of HVAC systems by enabling one structure to be adapted for HVAC systems of varying flow specifications and sizes. Moreover, because the adjustable filter assembly utilizes a same-sized filter within each filter retainer, only one filter product may be utilized for supplying the adjustable filter assembly with filters, reducing ordering costs and inventory maintenance demands.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An adjustable filter assembly for a heating, ventilation, and/or air conditioning (HVAC) system, comprising:
    a first filter retainer configured to capture a first filter;
    a second filter retainer configured to capture a second filter;
    a hinge coupled between first filter retainer and the second filter retainer and about which the first filter retainer and the second filter retainer are configured to rotate to position the first filter and the second filter at an angle relative to one another in a first angled operating configuration and to align the first filter and the second filter with one another in a second angled operating configuration;
    a first guide plate hingedly coupled to the first filter retainer and a second guide plate hingedly coupled to the second filter retainer, wherein the second guide plate is movable relative to the first guide plate in a direction transverse to a hinge axis about which the first filter retainer and the second filter retainer rotate to adjust the adjustable filter assembly between the first angled operating configuration and the second angled operating configuration; and
    a first guide rail and a second guide rail opposite the first guide rail, wherein the first guide plate and the second guide plate each extend between the first guide rail and the second guide rail, and wherein the first guide plate and the second guide plate are each configured to translate along the first guide rail and the second guide rail in the direction transverse to the hinge axis to adjust the adjustable filter assembly between the first angled operating configuration and the second angled operating configuration.

2. The adjustable filter assembly of claim 1, wherein the hinge comprises:
    a first panel coupled to the first filter retainer, a second panel coupled to a support, and a first hinge axis about which the first panel and the second panel rotate; and
    a third panel coupled to the second filter retainer, a fourth panel coupled to the support, and a second hinge axis about which the third panel and the fourth panel rotate.

3. The adjustable filter assembly of claim 1, wherein the hinge comprises:
    a first panel coupled to the first filter retainer and a second panel coupled to a support, wherein the first panel and the second panel are configured to rotate about the hinge axis, and wherein the second filter retainer is coupled to the support.

4. The adjustable filter assembly of claim 1, wherein the second guide plate is movable relative to the first guide plate to adjust the angle in the first angled operating configuration.

5. The adjustable filter assembly of claim 1, wherein the hinge includes a hinge shaft protruding therefrom, wherein the adjustable filter assembly includes:
    a first link coupled between the first guide plate and the hinge shaft; and
    a second link coupled between the second guide plate and the hinge shaft.

6. The adjustable filter assembly of claim 1, wherein:
    the first filter retainer includes a first engager configured to engage a first portion of the first filter and a second engager configured to engage a second portion of the first filter, and
    the second filter retainer includes a third engager configured to engage a first portion of the second filter and a fourth engager configured to engage a second portion of the second filter.

7. The adjustable filter assembly of claim 6, wherein the first guide plate is hingedly coupled to the first engager and the second guide plate is hingedly coupled to the fourth engager.

8. The adjustable filter assembly of claim 1, comprising the first filter and the second filter, wherein the first filter and the second filter have substantially a same size.

9. The adjustable filter assembly of claim 1, wherein the first filter retainer and the second filter retainer each include at least one C-channel.

10. The adjustable filter assembly of claim 1, wherein the adjustable filter assembly is configured to be disposed in a vertical orientation and in a horizontal orientation relative to an enclosure of the HVAC system.

11. The adjustable filter assembly of claim 1, wherein the hinge is a first hinge, and wherein the adjustable filter assembly includes:
    a third filter retainer configured to capture a third filter;
    a fourth filter retainer configured to capture a fourth filter; and
    a second hinge coupled between the third filter retainer and the fourth filter retainer and about which the third filter retainer and the fourth filter retainer are configured to rotate, wherein
    the second guide plate is hingedly coupled to the third filter retainer, wherein the first filter retainer is movable relative to the fourth filter retainer to adjust the adjustable filter assembly between the first angled operating configuration and the second angled operating configuration.

12. The adjustable filter assembly of claim 11, wherein the adjustable filter assembly includes:
a third guide plate hingedly coupled to the fourth filter retainer, wherein the first guide plate, the second guide plate, and the third guide plate are movable relative to one another along the first guide rail and the second guide rail to adjust the adjustable filter assembly between the first angled operating configuration and the second angled operating configuration.

13. The adjustable filter assembly of claim 11, wherein the third filter retainer and the fourth filter retainer are configured to rotate about the second hinge to position the third filter and the fourth filter at the angle relative to one another in the first angled operating configuration and to align the third filter and the fourth filter with one another in the second angled operating configuration.

14. The adjustable filter assembly of claim 1, wherein the second angled operating configuration is a flat operating configuration in which the first filter and the second filter are substantially coplanar and the angle is substantially 180 degrees.

15. An adjustable filter assembly for a heating, ventilation, and/or air conditioning (HVAC) system, comprising:
a plurality of filter modules, each filter module of the plurality of filter modules adjustable between a first operating configuration and a second operating configuration, wherein adjacent filter modules of the plurality of filter modules are each hingedly coupled to a respective guide plate, and wherein each filter module of the plurality of filter modules includes:
a first filter retainer configured to capture a first filter;
a second filter retainer configured to capture a second filter; and
a hinge coupled between first filter retainer and the second filter retainer and about which the first filter retainer and the second filter retainer are configured to rotate to position the first filter and the second filter at an angle relative to one another in the first operating configuration and to align the first filter and the second filter with one another in the second operating configuration; and
a first guide rail and a second guide rail opposite the first guide rail, wherein each guide plate extends between the first guide rail and the second guide rail, and wherein each guide plate is configured to translate along the first guide rail and the second guide rail to adjust the plurality of filter modules between the first operating configuration and the second operating configuration.

16. The adjustable filter assembly of claim 15, wherein the first filter retainer of each filter module of the plurality of filter modules includes a first engager configured to engage a first portion of the first filter and a second engager configured to engage a second portion of the first filter.

17. The adjustable filter assembly of claim 15, wherein each filter module of the plurality of filter modules is configured to be selectively removable from the adjustable filter assembly to adjust an effective filtering surface area of the adjustable filter assembly.

18. The adjustable filter assembly of claim 15, comprising an outer guide plate having a first side configured to affix to an inner surface of an enclosure of the HVAC system and having a second side configured to hingedly couple to an edge filter module of the plurality of filter modules.

19. The adjustable filter assembly of claim 15, comprising a respective first slide plate coupled to a first end of each guide plate and a respective second slide plate coupled to a second end of each guide plate, wherein the respective first slide plate and the respective second slide plate are configured to facilitate translation of each guide plate along the first guide rail and the second guide rail.

20. An adjustable filter assembly for a heating, ventilation, and/or air conditioning (HVAC) system, comprising:
a first filter retainer having a first end and a second end opposite the first end, wherein the first filter retainer is configured to capture a first filter between the first end and the second end;
a second filter retainer having a third end and a fourth end opposite the third end, wherein the second filter retainer is configured to capture a second filter between the third end and the fourth end, wherein the third end of the second filter retainer is hingedly coupled to the first end of the first filter retainer;
a first guide plate hingedly coupled to the second end of the first filter retainer;
a second guide plate hingedly coupled to the fourth end of the second filter retainer, wherein the second guide plate is movable relative to the first guide plate to enable rotation of the second filter retainer relative to the first filter retainer to position the first filter and the second filter at an angle relative to one another in a first operating configuration and to align the first filter and the second filter along a direction transverse to a direction of air flow through the adjustable filter assembly in a second operating configuration; and
a first guide rail and a second guide rail opposite the first guide rail, wherein the first guide plate and the second guide plate each extend between the first guide rail and the second guide rail, and wherein the second guide plate is configured to translate along the first guide rail and the second guide rail to adjust the adjustable filter assembly between the first operating configuration and the second operating configuration.

21. The adjustable filter assembly of claim 20, comprising:
a first slide plate coupled to the second guide plate and in contact with the first guide rail; and
a second slide plate coupled to the second guide plate and in contact with the second guide rail, wherein a first recess is formed in the second guide rail to retain the second slide plate in the first operating configuration, and wherein a second recess is formed in the second guide rail to retain the second slide plate in the second operating configuration.

22. The adjustable filter assembly of claim 20, wherein the first guide rail and the second guide rail are configured to be installed vertically within an enclosure of the HVAC system to position the adjustable filter assembly in a horizontal orientation, and wherein the first guide rail and the second guide rail are configured to be installed horizontally within the enclosure to position the adjustable filter assembly in a vertical orientation.

23. The adjustable filter assembly of claim 22, wherein the second guide rail is configured to be removed to release the first filter and the second filter for replacement in the horizontal orientation.

24. The adjustable filter assembly of claim 22, wherein the second operating configuration is a flat operating configuration in which the angle is substantially 180 degrees, wherein the first filter has a filter length, and wherein, in the vertical orientation and the flat operating configuration, the second guide plate is configured to be removed to enable the first end of the first filter retainer to be separated from the second end of the first filter retainer by a distance that is greater than the filter length to release the first filter for replacement.

25. An adjustable filter assembly for a heating, ventilation, and/or air conditioning (HVAC) system, comprising:
a plurality of filter modules each including a respective first filter retainer and a respective second filter retainer pivotally coupled to the first filter retainer, wherein the respective first filter retainer and the respective second filter retainer of the plurality of filter modules are arranged in an accordion-like configuration and are configured to be expanded or retracted from each other between a first angled operating configuration and a second angled operating configuration, wherein the accordion-like configuration enables rotation of the second filter retainer relative to the first filter retainer of each filter module of the plurality of filter modules to position the first filter retainer and the second filter retainer at an angle relative to one another in the first angled operating configuration and to align the first filter retainer and the second filter retainer along a direction transverse to a direction of air flow through the adjustable filter assembly in the second angled operating configuration; and
a first guide rail and a second guide rail opposite the first guide rail, wherein an end of each first filter retainer and an end of each second filter retainer is configured to extend between the first guide rail and the second guide rail, and wherein the accordion-like configuration enables the end of each first filter retainer to translate along the first guide rail and the second guide rail relative to the end of each second filter retainer to adjust the plurality of filter modules between the first angled operating configuration and the second angled operating configuration.

26. The adjustable filter assembly of claim 25, wherein the first filter retainer and the second filter retainer of each filter module of the plurality of filter modules is configured to capture a respective filter.

27. The adjustable filter assembly of claim 25, wherein the second angled operating configuration is a flat operating configuration in which each first filter retainer and each second filter retainer are substantially coplanar in a plane transverse to the direction of air flow through the adjustable filter assembly.

* * * * *